United States Patent
Kittler et al.

(10) Patent No.: US 10,521,649 B2
(45) Date of Patent: Dec. 31, 2019

(54) THREE DIMENSIONAL MODELLING

(71) Applicant: UNIVERSITY OF SURREY, Surrey (GB)

(72) Inventors: Josef Kittler, Surrey (GB); William Jeffrey Christmas, Surrey (GB); Fei Yan, Surrey (GB); Guosheng Hu, Surrey (GB)

(73) Assignee: University of Surrey, Surrey (GB)

( * ) Notice: Subject to any disclaimer, the term of this patent is extended or adjusted under 35 U.S.C. 154(b) by 0 days.

(21) Appl. No.: 15/551,247

(22) PCT Filed: Feb. 16, 2016

(86) PCT No.: PCT/GB2016/050378
§ 371 (c)(1),
(2) Date: Aug. 15, 2017

(87) PCT Pub. No.: WO2016/132113
PCT Pub. Date: Aug. 25, 2016

(65) Prior Publication Data
US 2018/0046854 A1    Feb. 15, 2018

Related U.S. Application Data

(60) Provisional application No. 62/116,602, filed on Feb. 16, 2015.

(51) Int. Cl.
*G06K 9/00* (2006.01)
*G06K 9/46* (2006.01)
*G06T 7/33* (2017.01)
*G06T 7/50* (2017.01)
*G06T 7/514* (2017.01)

(52) U.S. Cl.
CPC ...... *G06K 9/00288* (2013.01); *G06K 9/00201* (2013.01); *G06K 9/00208* (2013.01); *G06K 9/00248* (2013.01); *G06K 9/00281* (2013.01); *G06K 9/4661* (2013.01); *G06T 7/33* (2017.01); *G06T 7/344* (2017.01); *G06T 7/50* (2017.01);
(Continued)

(58) Field of Classification Search
None
See application file for complete search history.

(56) References Cited

U.S. PATENT DOCUMENTS 9,317,785 B1 * 4/2016 Moon ................ G06K 9/00234
2004/0201586 A1 * 10/2004 Marschner .......... G06K 9/4661
                                                    345/426

(Continued)

OTHER PUBLICATIONS

Zhoa et al, Minimizing Illumination Differences for 3D to 2D Face Recognition Using Lighting Maps, IEEE Transactions on Cybernetics, vol. 44, No. 5, May 2014.*

(Continued)

*Primary Examiner* — Andrae S Allison
(74) *Attorney, Agent, or Firm* — Chang & Hale LLP

(57) ABSTRACT

Two related methods of fitting a three dimensional model, and a method of performing facial recognition, are disclosed. One method comprises estimating and refining geometric information using image landmarks on an object in a two dimensional image. The other method comprises estimating and refining photometric information of the object in the two dimensional image. Furthermore, a method of performing image recognition is provided.

14 Claims, 12 Drawing Sheets

(52) U.S. Cl.
CPC .... *G06T 7/514* (2017.01); *G06T 2207/10028* (2013.01); *G06T 2207/30201* (2013.01)

(56) References Cited

U.S. PATENT DOCUMENTS

| | | | | |
|---|---|---|---|---|
| 2004/0263510 | A1* | 12/2004 | Marschner | G06T 13/40 345/419 |
| 2007/0086627 | A1* | 4/2007 | Kim | G06K 9/00241 382/118 |
| 2011/0102551 | A1* | 5/2011 | Iwasaki | G06T 3/40 348/46 |
| 2011/0255746 | A1* | 10/2011 | Berkovich | G06F 17/30247 382/103 |
| 2013/0235033 | A1* | 9/2013 | Kim | G06T 17/00 345/419 |
| 2014/0043329 | A1* | 2/2014 | Wang | G06T 17/20 345/420 |
| 2015/0243035 | A1* | 8/2015 | Narasimha | G06T 19/20 382/154 |

OTHER PUBLICATIONS

Romdhani, Sami, Volker Blanz, and Thomas Vetter. "Face identification by fitting a 3d morphable model using linear shape and texture error functions." European Conference on Computer Vision. Springer, Berlin, Heidelberg, 2002.*

S. Romdhani and T. Vetter, "Estimating 3D shape and texture using pixel intensity, edges, specular highlights, texture constraints and a prior," 2005 IEEE Computer Society Conference on Computer Vision and Pattern Recognition (CVPR'05), San Diego, CA, USA, 2005, pp. 986-993 vol. 2.*

Mortazavin, P., Face Recognition in Low Resolution Using a 3D Morphable Model http://www.ee.surrey.ac.uk/CVSSP/Publications/papers/Mortazavian-PHD-2013.pdf, 2013.*

International Search Report and Written Opinion for PCT/GB2016/050378 dated May 2, 2016.

Sami Romdhani et al., "Face Identification by Fitting a 3D Morphable Model Using Linear Shape and Texture Error Functions," European Conference on Computer Vision, 2002, Springer International Publishing, XP055266442, ISSN: 0302-9743, vol. 2353, pp. 3-19.

* cited by examiner (d) correspondence (c) contour landmarks (b) contour edge (a) model image

THREE DIMENSIONAL MODELLING

FIELD

The present invention relates to methods of modelling an object in three dimensions.

BACKGROUND

The intrinsic properties of 3D faces provide an ideal representation which is immune to variations in face appearance introduced by the imaging process such as viewpoint, lighting and occlusion. These invariant facial properties would be useful in a variety of applications in computer graphics and vision. However, it is challenging to recover the 3D face and scene properties (viewpoint and illumination) from the appearance conveyed by a single 2D image. Specifically, it is impossible to distinguish between texture and illumination effects unless some assumptions are made to constrain them both.

The 3D morphable model (3DMM) encapsulates prior knowledge about human faces that can be used for this purpose, and therefore it is a good tool for 3D face reconstruction. The reconstruction is conducted by a fitting process, by which a 3DMM estimates the 3D shape, texture, pose and illumination from a single image. To achieve an efficient and accurate fitting, much research has been conducted, and can be classified into two categories: 1) Simultaneous Optimisation (SimOpt): All the parameters (shape, texture, pose and illumination) are optimised simultaneously; and 2) Sequential Optimisation (SeqOpt): These parameters are optimised sequentially.

The SimOpt methods use gradient-based methods which are slow and tend to get trapped in local minima. On the other hand, SeqOpt methods can achieve closed-form solutions for some parameters optimisation; therefore, SeqOpt is more efficient. However, the existing SeqOpt methods make strong assumptions detailed below and do not generalise well.

In the SimOpt category, the fitting algorithm minimises the sum of squared differences over all colour channels and all pixels between the input and reconstructed images. A Stochastic Newton Optimisation (SNO) technique is used to optimise a nonconvex cost function. The SNO performance is poor in terms of both efficiency and accuracy because SNO is an iterative gradient-based optimiser which can end up in a local minimum.

The efficiency of optimisation is the driver behind some exemplary methods, where an Inverse Compositional Image Alignment (ICIA) algorithm is introduced for fitting. The fitting is conducted by modifying the cost function so that its Jacobian matrix can be regarded as constant. In this way, the Jacobian matrix is not updated in every iteration, greatly reducing the computational costs. However, ICIA cannot model illumination effects.

The Multi-Feature Fitting (MFF) strategy is known to achieve the best fitting performance among all the SimOpt methods. MFF makes use of many complementary features from the input image, such as edge and specularity highlights, to constrain the fitting process. The use of these features results in a better solution as demonstrated in "Estimating 3D Shape and Texture Using Pixel Intensity, Edges, Specular Highlights, Texture Constraints and a prior," in *Computer Vision and Pattern Recognition, 2005. IEEE*, 2005, pp. 986-99. Based on the MFF framework, two works improve the fitting robustness. In exemplary prior art, a resolution-aware 3DMM is proposed to improve the robustness to resolution variations, and a facial symmetry is advocated to improve the illumination fitting. However, all the MFF-based fitting methods are rather slow.

In the SeqOpt category, the 'linear shape and texture fitting algorithm' (LiST), was proposed for improving fitting efficiency. The idea is to update the shape and texture parameters by solving linear systems. On the other hand, the illumination and camera parameters are optimised by the gradient-based Levenberg-Marquardt method, exhibiting many local minima. The experiments reported in LiST show that the fitting is faster than the SNO algorithm, but with similar accuracy. However, in this approach it is assumed that the light direction is known before fitting, which is not realistic for automatic analysis. Also, the shape is recovered using an optical flow algorithm, which is relatively slow.

Another SeqOpt method decomposes the fitting process into geometric and photometric parts. The camera model is optimised by the Levenberg-Marquardt method, and shape parameters are estimated by a closed-form solution. In contrast to the previous work, this method recovers 3D shape using only facial feature landmarks, and models illumination using spherical harmonics. The least squares method is used to optimise illumination and albedo. Some prior art work improved the fitting performance by segmenting the 3D face model into different subregions. In addition, a Markov Random Field is used to model the spatial coherence of the face texture. However, the illumination models cannot deal with specular reflectance because only 9 low-frequency spherical harmonics bases are used. In addition, these prior art methods use an affine camera, which cannot model perspective effects.

The most recent SeqOpt work (Aldrian et al, "Inverse Rendering of Faces with a 3D Morphable Model", *Pattern Analysis and Machine Intelligence, IEEE Transactions on*, vol. 35, no. 5, pp. 1080-1093, 2013) also sequentially fits geometric and photometric models using least squares. However, different methods are used to estimate shape and texture in this work. Specifically, a probabilistic approach incorporating model generalisation error is used to recover the 3D shape. The reflectance estimation decouples the diffuse and specular reflection estimation. Two reflectance optimisation methods are proposed: (i) specular invariant model fitting and (ii) unconstrained illumination fitting. For (i), first, the RGB values of the model and input images are projected to a specularity-free space for diffuse light and texture estimations. Then the specularity is estimated in the original RGB colour space. For (ii), the diffuse light, texture and specularity are all estimated in the original RGB space. Both (i) and (ii) can achieve closed-form solutions for texture and illumination parameters. Aldrian achieves the state-of-the-art face reconstruction performance. The face recognition is comparable to MFF, but it is much faster. However, Aldrian also uses an affine camera, which cannot model perspective effects. In addition, in the case of (i) in this work, the colour of lighting is assumed to be known, which limits the model generalisation capacity; (ii) relaxes the lighting assumption of (i) and allows any combinations of ambient and directed light, however, (ii) estimates face texture coefficients considering only diffuse light.

Face recognition is an important application of the 3DMM. The face recognition performance is heavily influenced by the fitting accuracy. Most existing 3DMM methods assume that accurate facial landmarks are known. Z.-H. Feng, et al, "Random cascaded-regression copse for robust facial landmark detection," *Signal Processing Letters on, IEEE*, vol. 22, no. 1, 2013, p. 2 is an example of prior art that proposes to use automatically detected landmarks. Here, the automatic landmark detection and 3DMM fitting are combined by a data-driven Markov chain Monte Carlo method. This method is robust to automatic landmarks but it is rather slow.

Therefore, the present invention provides a method of modelling an object that reduces the number of required iterations in order to decrease the time taken to model the object, yet provides a better a better fit than existing SeqOpt methods. Furthermore, the present invention provides a method of modelling an object positioned close to a camera without distortion occurring. Furthermore, the present invention provides a fast and accurate method of performing facial recognition. Further advantages are set out in the detailed description.

SUMMARY

According to a first aspect of the present invention, there is provided a method of fitting a three dimensional 3D model to an object in a two dimensional 2D image, the method comprising: detecting a plurality of image landmarks on the object in the 2D image; estimating 3D geometric information of the plurality of image landmarks from the 2D image and known geometric information of a base model; and refining the geometric information of the base model so as to reduce a distance between the image landmarks and the corresponding model landmarks.

Estimating 3D geometric information may comprise: projecting the plurality of image landmarks onto the surface of the generic 3D model in order to estimate a depth of said image landmark in three-dimensional space.

Refining the geometric information of the base model may comprise minimising the distance between the image landmarks and the corresponding model landmarks by iteratively adjusting the pose and shape of the base model.

The plurality of image landmarks may be on the contour edge of the object in the 2D image.

Estimating 3D geometric information of a plurality of image landmarks may comprise estimating 3D geometric information of between 2 and 100 image landmarks. For example, 3 image landmarks may be used.

The method may further comprise: estimating light direction and light strength of the object from the 2D image; estimating the albedo of the object based on the estimated light direction and light strength; iteratively refining the estimation of light direction and light strength using the estimated albedo; and applying the refined light direction, light strength and albedo to the base model.

Estimating the light direction and light strength may comprise linearising a Phong model by keeping specular reflectance and shininess constant across the iterations.

The object may be a human face.

According to another aspect of the present invention, there is provided a method of performing facial recognition, the method comprising: generating a 3D model according to the previous aspect; rotating the input 2D image to a frontal view using the 3D model; extracting local features from the rotated 2D image; and comparing the local features with images in a database.

According to another aspect of the present invention, there is provided a method of fitting a three dimensional 3D model to an object in a two dimensional 2D image, the method comprising: estimating light direction and light strength of the object from the 2D image; estimating the albedo of the object based on the estimated light direction and light strength; iteratively refining the estimation of light direction and light strength using the estimated albedo; and applying the refined light direction, light strength and albedo to a base model.

Estimating the light direction and light strength may comprise linearising a Phong model by keeping specular reflectance and shininess constant across the iterations.

The object may be a human face.

According to another aspect of the present invention, there is provided a computer readable storage medium arranged to store computer program instructions which, when executed on one or more processors, perform the method according to any of the previous aspects.

Advantageously, these aspects reduce the number of iterations required to fit a 3D model to an object in a 2D image, resulting in a reduction in time and computational overhead. Furthermore, these aspects are more accurate than prior art methods.

All features described herein (including any accompanying claims, abstract and drawings), and/or all of the steps of any method or process so disclosed, may be combined with any of the above aspects in any combination, except combinations where at least some of such features and/or steps are mutually exclusive.

BRIEF DESCRIPTION OF THE FIGURES

Embodiments of the present invention will now be described, by way of example only, with reference to the accompanying drawings, in which.

In the drawings, like reference numerals refer to like features throughout.

DETAILED DESCRIPTION 1.1. Contributions

Figure 1:
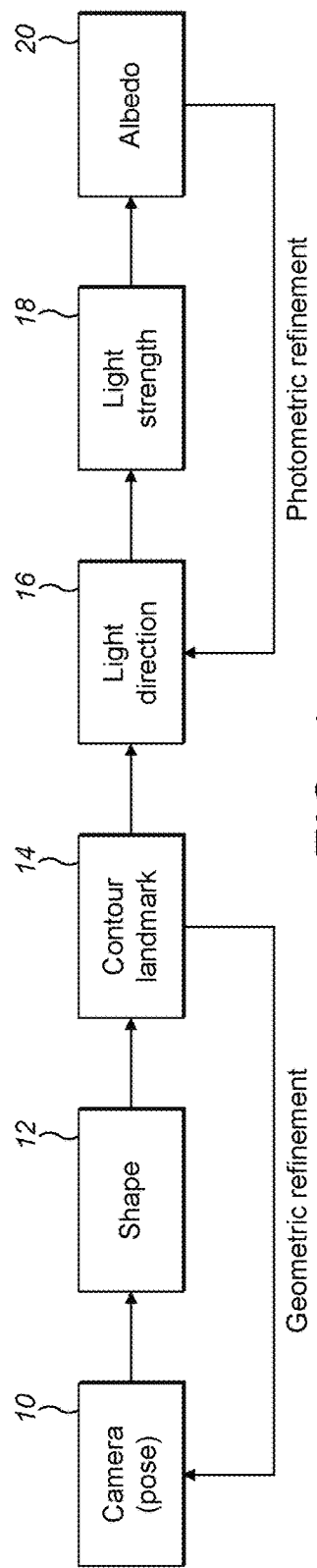
FIG. 1 is a flowchart showing a process for generating a 3D model according to an embodiment of the present invention.

With reference to FIG. 1, we introduce a novel SeqOpt fitting framework, referred to as 'efficient stepwise optimisation' (ESO), which groups the parameters to be optimised into five categories: camera model (pose) 10, shape 12, light direction 16, light strength 18 and albedo (texture) 20. ESO decomposes the fitting into geometric and photometric parts.

Preferably, ESO is applied to model faces. However, it can also be applied to model other objects with a standard structure, such as cars.

Geometric Model Fitting

Both perspective camera and affine camera models have been used in prior art methods. The affine camera model assumes that the object's depth is small compared with its distance from the camera, which is often not the case. It cannot model perspective imaging effects when the face is close to the camera. In comparison, a perspective camera is more general, and therefore is used in embodiments of the present invention. To efficiently estimate the shape parameters and also to adapt to the perspective camera, embodiments provide a new linear method, which uses a set of sparse landmarks (22 in FIG. 2) to construct a cost function in 3D model space. In addition, embodiments use face contour landmarks 22 detailed in Section 4.3 to refine the camera and shape estimates. An algorithm which automatically creates the correspondence between the contour landmarks 22, 24 of the input image and its 3D model is presented.

Photometric Model Fitting

According to prior art methods, both Phong and Spherical Harmonics (SH) models have been adopted to estimate illumination. Specifically, to model both diffuse light and specularity, an exemplary prior art method using an SH model uses 81 bases. Compared with the SH model, the Phong model has a more compact representation, and therefore is used in embodiments of the present invention. In embodiments of the present invention, the illumination is modelled as a combination of a single distant point source plus uniform ambient light, thus keeping the number of coefficients to be found to a minimum. Unlike the gradient descent search used by exemplary prior art methods, the present invention provides a novel approach to optimise both Phong model parameters and albedo. Specifically, embodiments detailed in Section 4 linearise the nonlinear Phong model. The objective functions of these linear methods are convex and global solutions are guaranteed. With the estimated Phong parameters to hand, albedo can also be estimated by solving a linear system.

Face Recognition

Embodiments of the present invention provide a fully automatic face recognition (AFR) system, which is referred to throughout as ESOAFR. This system is constructed using bespoke components. In contrast to exemplary prior art methods, we use a very efficient cascaded regression technique to automatically detect landmarks, which are then fed into the ESOAFR system. ESOAFR supports two types of feature extraction: holistic and local features. This differs from the traditional 3DMMs which usually only use holistic features (shape and texture coefficients) for face recognition. Experimental results demonstrate that the local features are more powerful than the holistic features.

It should be noted that the technical effect of the innovations, namely of:

1. linearisation of the shape reconstruction function, is that it allows modelling of images acquired with a perspective camera, in contrast to affine camera imaging which approximates perspective only for objects at a considerable distance. The linearisation allows a closed form solution (like affine camera fitting) without compromising accuracy for faces close to the camera;

2. linearisation of the Phong illumination model, in particular the estimation of the light direction, is accuracy, robustness and computational efficiency. Accuracy and robustness derive from the use of all the image pixels in the fitting process through closed-form solutions, rather than a small subset of pixels selected by random image sampling, which fails to exploit all the available input information (affects accuracy), with somewhat unpredictable outcome (affecting robustness). The merit of the Phong model, as compared with spherical harmonics model, is its compactness (number of unknowns);

3. the use of contour landmarks, in contrast to contour edges used by exemplary prior art methods, is computational efficiency (a smaller number of points to process) and robustness, as edges are invariably noisy; and 4. ESO fitting process enabled by 1 and 2 and 3, is efficiency.

2. Related Work

First, 3D Morphable Models (3DMMs) fitting strategies are introduced in Section 2.1. As a 3DMM can intrinsically model pose and illuminations variations, it is widely used for pose- and illumination-invariant face recognition, which is then introduced in Section 2.2.

2.1. 3D Morphable Models Fitting

The 3DMM, first proposed by Blanz and Vetter, has successfully been applied to computer vision and graphics. A 3DMM consists of separate face shape and texture models learned from a set of 3D exemplar faces. By virtue of a fitting process, a 3DMM can recover the face (shape and texture) and scene properties (illumination and camera model) from a single image as shown in FIG. 1. The recovered parameters can be used for different applications, such as realistic face synthesis and face recognition. However, it should be noted that it is particularly difficult to achieve an accurate fitting for two reasons. Firstly, when recovering the 3D shape from a single 2D image, the depth information is lost through the projection from 3D to 2D. Secondly, separating the contributions of albedo and illumination is an ill-posed problem. Motivated by the above challenges, considerable research has been carried out to improve the fitting performance in terms of efficiency and accuracy. As mentioned above, these methods can be classified into two groups: SimOpt and SeqOpt.

Compared with exemplary prior art SimOpt methods, ESO is much more efficient because of the use of closed-form solutions. In particular, our experiments demonstrate that ESO improves the optimisation efficiency by an order of magnitude in comparison with MFF yet achieves very competitive fitting performance. Moreover, ESO overcomes the weaknesses of earlier SeqOpt methods. Specifically, the shape reconstruction of ESO supports the perspective camera, while the exemplary methods are limited to the affine camera. Therefore our shape reconstruction is more robust to perspective effects. According to embodiments of the present invention, we linearise the Phong model; ESO models specularity, while the prior art does not. Under unconstrained illuminations, Aldrian estimates face texture coefficients considering only diffuse light. However, ESO considers both diffuse and specularity in the same condition. In addition, embodiments of the present invention use contour landmarks for robust fitting. Also, ESO is much faster than state-of-the-art methods detailed in Section 5.2.1.

2.2. Pose and Illumination-Invariant Face Recognition

Face recognition under pose and illumination variations is a challenging task. As discussed, 3DMM is a good tool to solve the pose problem. Apart from 3DMM, other methods for pose- and illumination-invariant face recognition are briefly introduced in this section. These methods are basically categorised into 2D and 3D methods.

For 2D methods, the impact of pose variations is addressed in either image or feature space. The former methods aim to establish the pixel-level correspondence under different poses in the image space, such as the Locally Linear Regression, Partial Least Square, Markov Random Field, Stereo Matching, Generalized Multiview Analysis, and Probabilistic Stack-flow. The latter methods project the pixel values into pose- and/or illumination-invariant feature spaces, such as Canonical Correlation Analysis, Tied Factor Analysis, Latent Space Discriminative Analysis, Orthogonal Discriminant Vector and Deep Learning.

In contrast to 2D methods, prior 3D methods explicitly model the facial pose variations that are intrinsically caused by 3D rigid motion. In these methods, a 3D face model is fitted to the 2D input image. Accurate fitting is essential for good face recognition performance. After fitting, the pose problem can be solved by either pose normalisation or pose synthesis. In the case of pose normalisation both gallery and probe images are rotated to a frontal view by means of a 3D model. In contrast, the pose synthesis approach generates multiple gallery images of different poses from the frontal images of each subject. A probe image is only matched against those of the same pose in the gallery. Once the pose problem is solved, features are extracted as a prerequisite to face recognition. The extracted features can be either (1) local features or (2) holistic features. Local features, such as Gabor features, Local Binary Pattern, Local Gabor Binary Pattern, and Local Phase Quantisation are widely used. In contrast, most 3DMM-based face recognition methods use only holistic features. In the face recognition system according to embodiments of the present invention, both local and holistic features are extracted based on ESO fitting.

3. 3D Morphable Model and Fitting Problem Formulation

According to an embodiment of the present invention, an object is modelled in three dimensional space using the ESO method shown in FIG. 1. Here, the method is divided into a geometric analysis part, where steps include determining the pose 10, shape 12 and contour landmarks 14, which in turn are used to refine the pose and shape; and a photometric analysis part, where steps include determining illumination and albedo 20, where the albedo 20 is used to refine the illumination. Illumination comprises two steps—determining light direction 16 and determining light strength 18. Each of these steps will now be explained in more detail, particularly with reference to Section 4.

A 3DMM face model is created from a training set of 3D face scans that have been registered in dense correspondence. The ith vertex $v_i$ of a registered face is located at $(x_i, y_i, z_i)$, and has the RGB colour values $(r_i, g_i, b_i)$. Hence a registered face can be represented in terms of shape and texture as a pair of vectors:

$$s'=(x_1, \ldots, x_n, y_1, \ldots, y_n, z_1, \ldots, z_n)^T \quad (1)$$

$$t'=(r_1, \ldots, r_n, g_1, \ldots, g_n, b_1, \ldots, b_n)^T \quad (2)$$

where n is the number of vertices. Given a set of m example faces s' and t', we apply Principal Component Analysis (PCA) to concisely express each face ($s \in \mathbb{R}^{3n}$ and $t \in \mathbb{R}^{3n}$) in terms of a small number of parameters $\alpha$ and $\beta$ as:

$$s=s_0+S\alpha, t=t_0+T\beta \quad (3)$$

where $s_o$ and $t_o$ are the mean shape and texture of m training faces respectively. The columns of $S \in \mathbb{R}^{3n \times (m-1)}$ and $T \in \mathbb{R}^{3n \times (m-1)}$ are the eigenvectors of shape and texture covariance matrices. The coefficients $\alpha=(\alpha_1, \ldots, \alpha_{m-1})^T$ and $\beta=(\beta_1, \ldots, \beta_{m-1})^T$ constitute low-dimension codings of s and t, respectively. We assume that $\alpha$ and $\beta$ have normal distributions:

$$p(\alpha) = e^{(-\frac{1}{2}\|\alpha./\sigma_s\|^2)} \quad (4)$$

$$p(\beta) = e^{(-\frac{1}{2}\|\beta./\sigma_t\|^2)} \quad (5)$$

where ./denotes the element-wise division operation, $\sigma_s=(\sigma_{1,s}, \ldots, \sigma_{m-1,s})^T$, $\sigma_t=(\sigma_{1,t}, \ldots, \sigma_{m-1,t})^T$, and $\sigma_{i,s}^2$ and $\sigma_{i,t}^2$, are the ith eigenvalues of shape and texture covariance matrices respectively.

Given a 2D input image, a 3DMM is used to generate/render a 2D face image which resembles the input image via a fitting process. The 3DMM fitting can explicitly reconstruct the 3D shape, texture, camera model and lighting from the input image. The 3D reconstruction is conducted by minimising the RGB value differences between the input face image and model rendered one. To perform such an optimisation, a 3DMM has to be aligned to the input image. Specifically, a vertex $x_{3d}^M$ of the shape model s is projected to a 2D coordinate $x_{2d}^M$ in the 2D image plane via a camera projection defined by extrinsic camera parameter set $\rho$. Note that not all the $x_{3d}^M$ are visible in the model rendered image due to self-occlusion. The vertex visibility is tested by a z-buffering method. The rendered RGB values generated by all visible vertices of the model are concatenated as a vector $a^M$, and the RGB values at the nearest corresponding points of the input image are concatenated as a vector $a^I$. Varying $\rho$ and s will affect the vertex visibility of the face model: consequently, it will cut out a different $a^I$ from the input image. Therefore, both $a^I$ and $a^M$ depend on $\rho$ and $\alpha$. The optimisation of this alignment is detailed in sections 4.1 and 4.2. In addition to alignment (geometric part), the rendered image $a^M$ is also determined by albedo and illumination (photometric part). The albedo 20 is represented by $t(\beta)$ and the illumination is modelled by the Phong reflection with parameter $\mu$. Combining both geometric and photometric parts, the cost function can be written as $$\min_{\alpha,\rho,\beta,\mu} \|a^I(\alpha,\rho) - a^M(\beta,\mu,\alpha,\rho)\|^2 \quad (6)$$

Once the alignment is established ($\alpha$ and $\rho$ are known), the cost function can be rewritten as $$\min_{\beta,\mu} \|a^I - a^M(\beta, \mu)\|^2 \quad (7)$$

To explicitly formulate $a^M$ with an established alignment, $a^M$ is generated by the interplay of skin albedo $t(\beta)$ and incident light represented as the sum of contributions from ambient, diffuse and specular lights:

$$a^M = \underbrace{l_a * t}_{ambient} + \underbrace{(l_d * t) * (N_3 d)}_{diffuse} + \underbrace{l_d * e}_{specular} \quad (8)$$

where $$l_a = (l_a^r 1^T, l_a^g 1^T, l_a^b 1^T)^T \in \mathbb{R}^{3n} \quad (9)$$

$$l_d = (l_d^r 1^T, l_d^g 1^T, l_d^b 1^T)^T \in \mathbb{R}^{3n} \quad (10)$$

$1 \in \mathbb{R}^n$ is a vector with all the entries equal to 1; $\{1_a^r, 1_a^g, 1_a^b\}$ and $\{1_d^r, 1_d^g, 1_d^b\}$ are strengths of ambient and directed light in RGB channels, respectively; * denotes the element-wise multiplication operation; the matrix $N_3 = (N^T, N^T, N^T)^T$, $N \in \mathbb{R}^{n \times 3}$ is a stack of the surface normal $n_i \in \mathbb{R}^3$ at every vertex i; $d \in \mathbb{R}^3$ is the light direction; vector $e \in \mathbb{R}^{3n}$ is a stack of the specular reflectance $e_i$ of every vertex for the three channels, i.e., $$e_i = k_s \langle v_i, r_i \rangle^\gamma \quad (11)$$

where $v_i$ is the viewing direction of the ith vertex. Since the camera is located at the origin, the value of $v_i$ is equal to the position of this vertex. $r_i$ denotes the reflection direction of the ith vertex: $r_i = 2\langle n_i, d\rangle n_i - d$. $k_s$ and $\gamma$ are two constants of the specular reflectance and shininess respectively. Note that $k_s$ and $\gamma$ are determined by the facial skin reflectance property, which is similar for different people. They are assumed constant over the whole facial region. For the sake of simplicity, in our work, we also assume that $k_s$ and $\gamma$ are the same for the three colour channels. Thus each entry $e_i$ is repeated three times in constructing vector e. In this work, $k_s$ and $\gamma$ are set to values 0.175 and 30 respectively.

4. Efficient Stepwise Optimisation (ESO)

This section details our ESO framework, as shown in FIG. 1. ESO is a Sequential Optimisation method which groups all the parameters into 5 categories: camera (pose) 10, shape 12, light direction 16, light strength 18 and albedo 20. These parameters are optimised by iterating two sequences of steps in turn a few times as shown in FIG. 1. Closed-form solutions are obtained in these steps. First, the perspective camera parameters are estimated using a set of 2D landmarks 22 (which may be referred to as image landmarks 22) and $s_o$ of equation 3. Second, the shape parameters are estimated by a new linear method, which constructs a cost function by projecting the 2D landmarks 22 into 3D space. Third, contour landmarks 22 are used to improve camera and shape estimates. The first three steps are repeated several times to refine the geometric ingredients of the model. During the refinement, $s_o$ is replaced by the current estimated shape for estimating the camera parameters. At the end of this process, a correspondence between the input image and 3DMM is created. Based on this alignment, we again use linear methods to estimate illumination 16, 18 and albedo 20. Fourth, we use the generic texture model $t_o$ of equation 3 to estimate the light direction 16 based on the assumption that the face is a Lambertian surface. Fifth, the light strengths 18 of the Phong model are estimated using the generic texture model and the estimated light direction. Finally, the albedo 20 is estimated using the evaluated light direction and strengths. The last three steps are also repeated to refine the photometric estimates. In the process of refinement, the estimated albedo is used instead of $t_o$ for estimating light direction and strengths. The topology of the ESO is shown in FIG. 1.

In Section 4.1 to 4.6, each step of ESO is explained in more detail. Section 4.7 visualises the output of each step and Section 4.8 discusses the ESO-assisted facial feature extraction.

4.1. Camera Parameters Estimation

The first step uses the landmarks (image landmarks 22 and corresponding model landmarks 24) to estimate the camera parameters that roughly align the input image to the model. For this alignment, a vertex $x_{3d}^M$ of the shape model s is projected to a 2D coordinate $x_{2d}^M = (x, y)^T$ via a camera projection W. The projection W ean be decomposed into two parts, a rigid transformation $F_r$ and a perspective projection $F_p$:

$$F_r: x_{3d}^M \to w \quad w = R x_{3d}^M + \tau \quad (12)$$

$$F_p: w \to x_{2d}^M \quad x = o_x + f \frac{w_x}{w_z}, \quad y = o_y + f \frac{w_y}{w_z} \quad (13)$$

where w denotes the camera-centered coordinate of $x_{3d}^M$; $w = (w_x, w_y, w_z)^T$; $R \in \mathbb{R}^{3\times3}$ denotes the rotation matrix; $\tau \in \mathbb{R}^3$ is a spatial translation; f denotes the focal length, and $(o_x, o_y)$ defines the image-plane position of the optical axis.

The camera parameters $\rho = \{R, \tau, f\}$ are recovered by minimising the distance between the input image landmarks 22 and those reconstructed from the model (in other words, the model landmarks 24):

$$\min_\rho \Sigma \|x_{2d}^I - x_{2d}^M(\beta)\|^2, \text{ and } x_{2d}^M = W(x_{3d}^M; \rho) \quad (14)$$

where $x_{2d}^I$ denotes the landmark of an input image, or the image landmark 22. This cost function is solved by the Levenberg-Marquardt algorithm. Note that $x_{3d}^M$, which depends on the shape model s, is a constant in this step. In the first iteration, s is set to $s_o$. In subsequent iterations, s is replaced by the one estimated in the previous iteration. The estimated camera parameters feed into shape estimation described in Section 4.2. The contour landmarks described in Section 4.3 constrain both camera and shape estimations.

4.2. Shape Parameters Estimation

After the camera parameters are obtained, the shape parameters $\alpha$ can be estimated. In general, the methods proposed for estimating the shape parameters can be classified into two groups: (1) gradient-based methods and (2) linear methods. The gradient-based methods optimise $\alpha$ by solving the general fitting cost function of equation 6. Noting that the shape variations cause the facial landmarks to shift, therefore, more efficient linear methods, which only use landmarks to recover $\alpha$, have been proposed. However, these methods are based on an affine camera. In contrast, we propose a linear method, which is applicable to a general perspective camera, by minimising the distance between the observed and reconstructed landmarks. In other words geometric information of a base model is refined so as to reduce a distance between the image landmarks and the corresponding model landmarks. Unlike equation 14 defined in the 2D image space, here the cost function is defined in 3D model space as:

$$\min_\alpha \Sigma \|x_{3d}^I - x_{3d}^M(\alpha)\|^2 \quad (15)$$

where the image landmarks $x_{2d}^I$ are back-projected to $x_{3d}^I$ via $x_{3d}^I = W^{-1}(x_{2d}^I; \rho)$. Since $x_{3d}^M$ is a vertex of shape model s, therefore $x_{3d}^M$ is a function of $\alpha$. In other words three-dimensional 3D geometric, or depth, information of a plurality of image landmarks are estimated from the 2D image and known geometric information of a base model. The vectorised cost function is defined as:

$$\min_\alpha \|\hat{s}^I - \hat{s}^M(\alpha)\|^2 + \lambda_1 \|\alpha \cdot / \sigma_s\|^2 \quad (16)$$

where $\hat{s}^I$ and $\hat{s}^M$ are stacked by $x_{3d}^I$ and $x_{3d}^M$ respectively; $\hat{s}^M = \hat{s}_0 + \hat{S}\alpha$, $\hat{s}_0$ and $\hat{S}$ are constructed by choosing the corresponding elements at the landmark positions from $s_0$ and S defined in equation 3; $\lambda_1$ is a free weighting parameter; $\|\alpha \cdot / \sigma_s\|^2$ is a regularisation term based on equation 4. The closed-form solution for $\alpha$ is:

$$\alpha = (\hat{S}^T \hat{S} + \Sigma_s)^{-1} \hat{S}^T (\hat{s}^I - \hat{s}_0) \quad (17)$$

where diagonal matrix $\Sigma_s = \text{diag}(\lambda_1/\sigma_{1,s}^2, \ldots, \lambda_1/\sigma_{m-1,s}^2)$ Finally, we explain how to construct $W^{-1}$. As shown in equations 12 and 13, $W^{-1}$ consists of 2 transformations: $F_p^{-1}$ and $F_r^{-1}$.

However, $x_{2d}^M$ cannot be projected to w via $F_p^{-1}$ unless $w_z$ is known. In this work, $w_z$ is approximated by $F_r(x_{3d}^M)$, where $x_{3d}^M$ is constructed from the mean shape $s_0$ and the estimated s in the first and subsequent iterations, respectively.

4.3. Contour Landmark Constraints

Figure 2D:
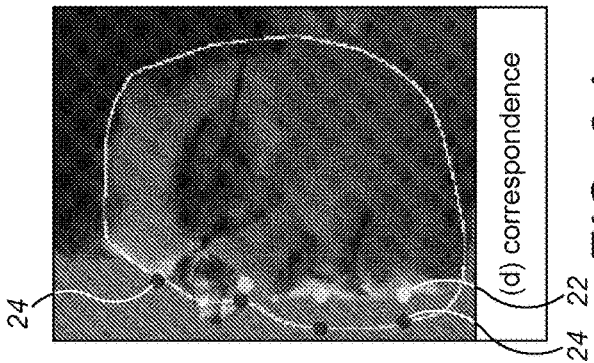
FIGS. 2a to 2d show a 3D model being fitted to an object geometrically.
Figure 2C:
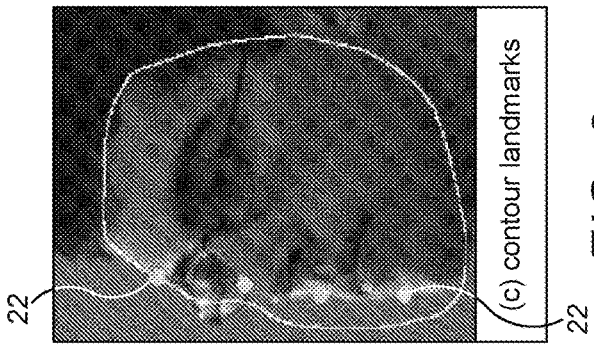
Figure 2B:
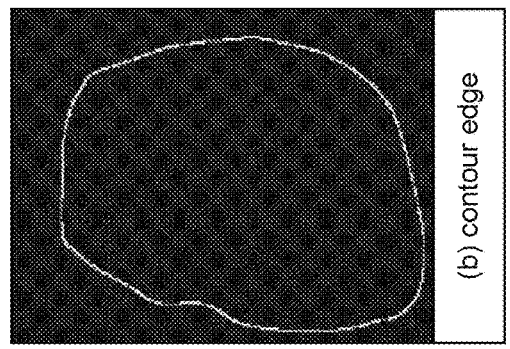
Figure 2A:
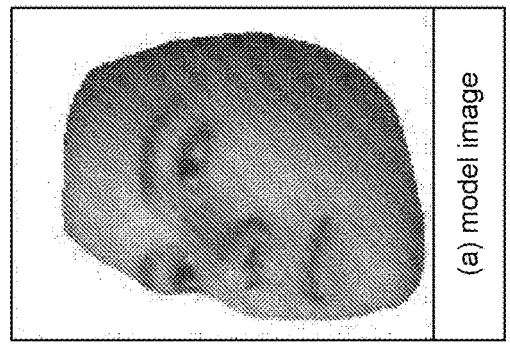

One impediment to accurate 3D shape reconstruction from a non-frontal 2D face image stems from the lack of constraints on the face contours. In prior art methods, the contour edges are defined as the occluding boundary between the face and non-face area, and they are used to constrain the fitting. The contour edges of a model-based reconstruction of a 2D image are shown in FIG. 2b. However, the computational cost of using contour edges is high. To solve this problem, contour landmarks, i.e. landmarks on the contour edges, are proposed in this work to constrain the camera and shape fitting. The contour landmarks are used because: 1) it is computationally efficient as contour landmarks are sparser than contour edges; 2) they can be accurately detected by existing 2D facial landmark detectors.

Given contour landmarks of an input image (image landmarks 22, in FIG. 2c), Algorithm 1, below, is used to search for the corresponding contour landmarks of a 3DMM (model landmarks 24 in FIG. 2d) along the contour edges. Once this correspondence is established, these contour landmark pairs will be added to the available landmarks set in Equations 14 and 16 to improve the estimation of camera model and shape.

---
Algorithm 1
---
Input:
2D contour landmarks coordinates $\eta = \{\eta_1 ... \eta_{k1}\}$
3DMM rendered contour edge coordinates $\zeta = \{\zeta_1 ... \zeta_{k2}\}$ ($k_2 \gg k_1$) via W
3D vertex indices $\varphi = \{\varphi_1 ... \varphi_{k2}\}$ corresponding to $\zeta$
Output: 3D vertex indices $\delta$ corresponding to $\eta$
1   for i = 1; i ≤ $k_1$, i + + do
2       for j = 1; j ≤ $k_2$; j + + do
3           $dist_j = \|\eta_i - \zeta_j\|_2$
4       end
5       $\delta_i = \varphi_{arg\ min_j\{dist_j\}}$
6   end
7   return $\delta$

4.4. Light Direction Estimation

Once the parameters of the camera model and the shape are estimated, the input image is aligned to a 3DMM, and the reflectance parameters can then be estimated. The first task is to find the light direction d. In this step, all the variables are regarded as constant apart from d, so the cost function is obtained by combining equation 7 and equation 8:

$$\min_d \|a^I - l_a * t - (l_d * t) * (N_3 d) - l_d * e\|^2 \quad (18)$$

The minimisation of equation 18 is a non-linear problem for two reasons: 1) the exponential form of e in equation ii, and 2) the element-wise multiplication between $l_d$*t and $N_3$d. To eliminate these nonlinear dependencies, firstly, we can precompute the value of e based on the assumptions: i) $k_s$, and $\gamma$ are constant; ii) the values of v and r are set to those of the previous iteration. Secondly, to avoid the element-wise multiplication between $l_d$*t and $N_3$d, the cost function is reformulated as:

$$\min_d \|a^I - l_a * t - l_d * e - (A * N_3) d\|^2 \quad (19)$$

where $A=[l_d*t, l_d*t, l_d*t] \in \mathbb{R}^{3n \times 3}$. By this reformulation, the closed-form solution can be found as: $d=((A*N_3)^T(A*N_3))^{-1}(A*N_3)^T(a^I - l_a*t - l_d*e)$. Then d is normalised to a unit vector.

For the first iteration, we initialise the values of t, $l_a$ and $l_d$ as follows. 1) We assume that the face is a Lambertian surface and the ambient light is negligible. Consequently, only the diffuse light in equation 8 is modelled. 2) The strengths of diffuse light $\{l_d^r, l_d^g, l_d^b\}$ and t are respectively set to $\{1,1,1\}$ and $t_o$. With these assumptions, the cost function in the first iteration becomes:

$$\min_d \|a^I - (B*N_3) d\|^2 \quad (20)$$

where $B=[t_0, t_0, t_0] \in \mathbb{R}^{3n \times 3}$. The closed-form solution is: $d=((B*N_3)^T(B*N_3))^{-1}(B*N_3)^T a^I$. Then d is normalised to a unit vector.

The estimated light direction is fed into the light strength and albedo estimations detailed in Section 4.5 and Section 4.6. In turn, the output of these is used in the subsequent refinements of light direction by solving equation 19.

4.5. Light Strength Estimation

Having obtained an estimate of d, the ambient and directed light strengths can be recovered. For simplicity, only the red channel is described. The cost function for red channel is:

$$\min_{l_{ad}^r} \|a^{I,r} - C l_{ad}^r\|^2 \quad (21)$$

where $a^{I,r}$ is the red channel of $a^I$; $C=[t^r, t^r*(Nd)+e^r] \in \mathbb{R}^{n \times 2}$, $t^r$ and $e^r$ are the red channels of t and e; $l_{ad}^r=(l_a^r, l_d^r)^T$. The closed-form solution for $l_{ad}^r$ is:

$$l_{ad}^r = (C^T C)^{-1} C^T a^{I,r} \quad (22)$$

Note that t is set to $t_o$ as a starting point in the first iteration. The green and blue channels are solved in the same way.

4.6. Albedo Estimation

Once the light direction and strengths are recovered, the albedo can be estimated. Similarly to the estimation of shape parameters, we regularise the albedo estimation based on equation 5, leading to the cost function:

$$\min_\beta \|a^I - (t_0 + T\beta) * l_a - (t_0 + T\beta) * l_d * (N_3 d) - l_d * e\|^2 + \lambda_2 \|\beta \cdot / \sigma_t\|^2 \quad (23)$$

where $\lambda_2$ is a free weighting parameter. The closed-form solution is:

$$\beta = (T^T T + \Sigma_t)^{-1} T^T (a' - t_0) \quad (24)$$

where $a'=(a^I - l_d * e) \cdot / (l_a + l_d * (N_3 d))$, and the diagonal matrix $\Sigma_t = diag(\lambda_2/\sigma_{1,t}^2, \ldots, \lambda_2/\sigma_{m-1,t}^2)$.

4.7. Stepwise Fitting Results Visualisation

Figure 3:
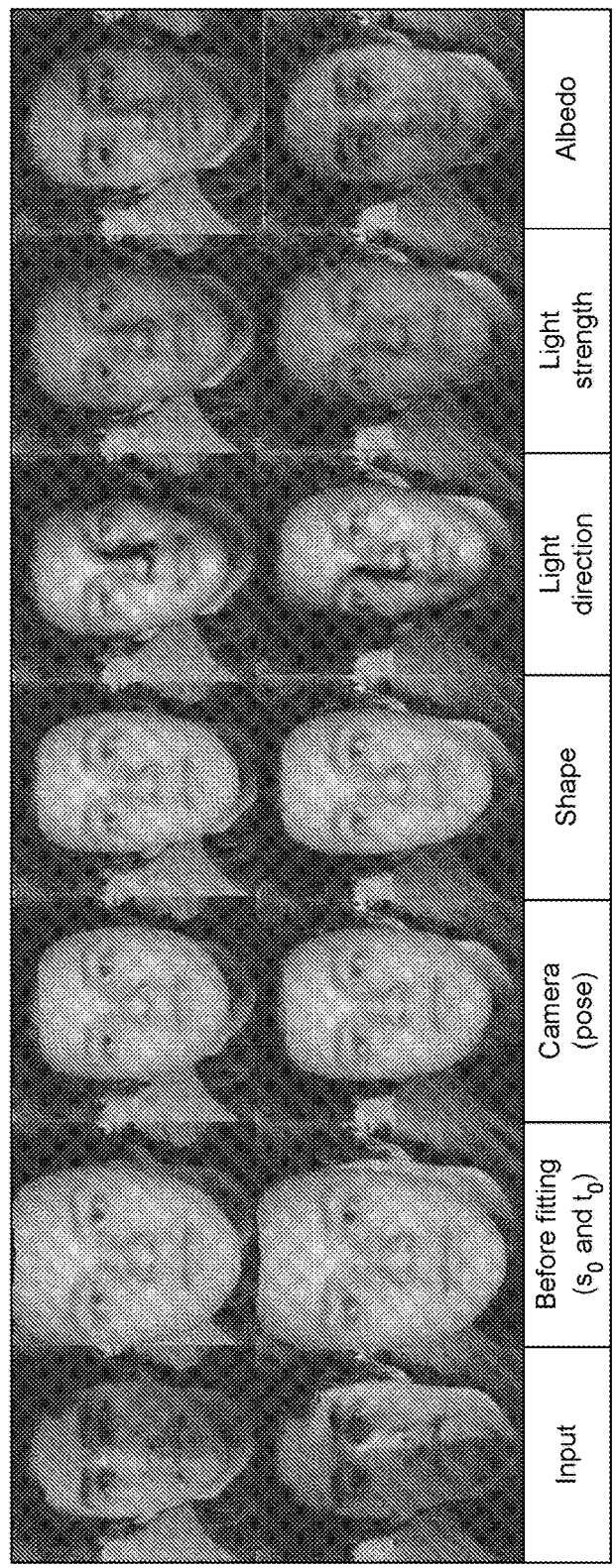
FIG. 3 shows a process for generating a 3D model according to an embodiment of the present invention.

In this section, the fitting results of each step are visualised. The input images with various pose and illuminations are from the Multi-PIE database. The two input images in FIG. 3 are illuminated by the left and right light sources, respectively. Clearly, the camera model, shape, light direction, light strengths and albedo are well recovered.

4.8. Facial Feature Extraction

After fitting, different facial features can be extracted for different applications. In this section, we discuss both holistic and local feature extractions for face recognition. Traditionally, most of the 3DMM-based face recognition systems only extract holistic features, i.e. shape and texture coefficients ($\alpha$ and $\beta$). Specifically, shape and texture coefficients are extracted via fitting and can be concatenated into a vector to represent a face. However, these holistic features cannot capture local facial properties, e.g. a scar, which may be very discriminative among people. In this work, we extract pose and illumination parameters which are used to geometrically and photometrically normalise the image. A conventional local feature extraction method is applied to a pose- and illumination-normalised 2D image. Specifically, ESO recovers all the parameters given a single input image. With these recovered parameters, illumination normalisation is achieved by removing the directed lighting. The illumination-normalised input image $a_{in}^I$ is then given by $$a_{in}^I = (a^I - l_d * e) \cdot / (l_a + l_d * (N_3 d)) \qquad (25)$$

Figure 12:
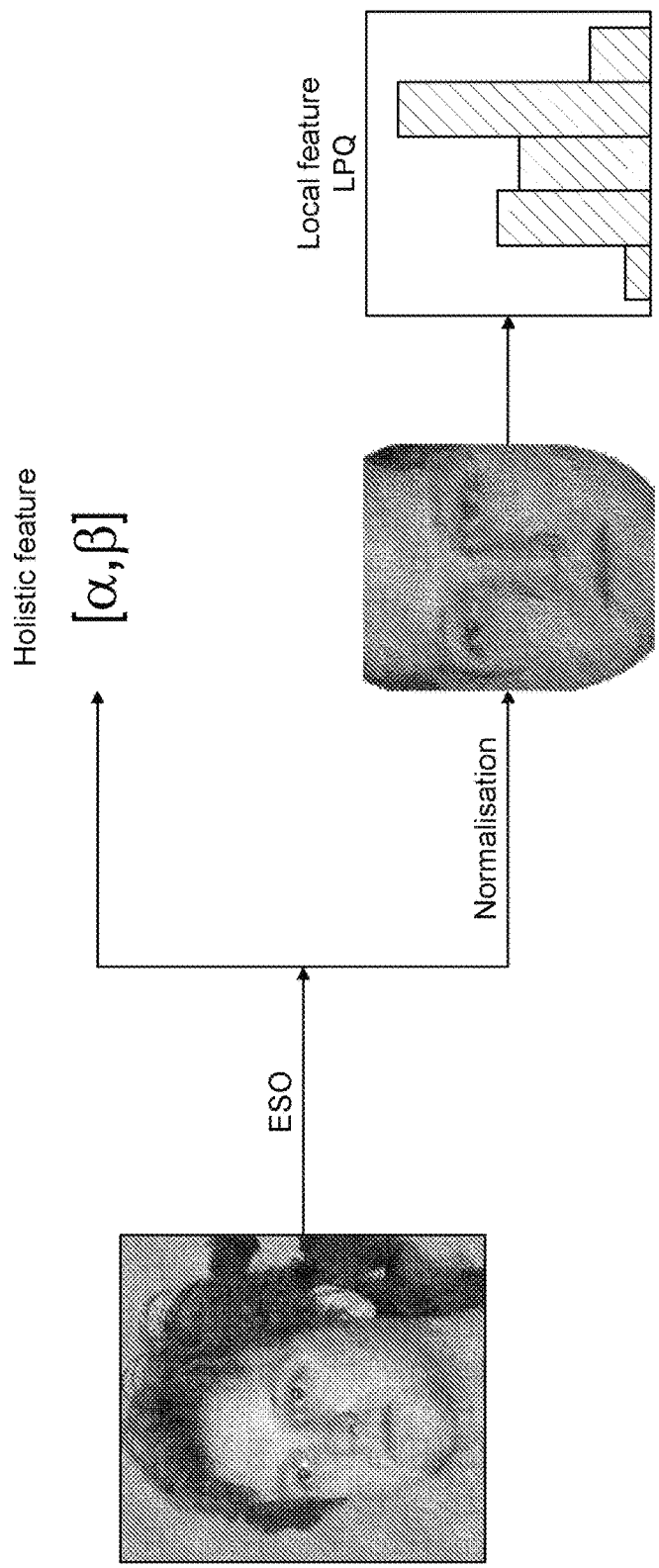
FIG. 12 shows a method of performing facial recognition according to an aspect of the present invention.

Pose normalisation is performed by setting p to rotate the face to a frontal view. In this work, we extract the local descriptor Local Phase Quantisation (LPQ) from the photometrically and geometrically normalised image. Both holistic and local features extraction is shown in FIG. 12.

5. Experiments

In this section, a comprehensive evaluation of our methodology is described. First, face reconstruction performance is evaluated. Then, in face recognition experiments, we compare our ESO with the existing 3DMM methods and other state-of-the-art methods.

5.1. Face Reconstruction

Figure 4:
FIG. 4 shows input images with different pose and illumination variations, with is corresponding images reconstructed according to the present invention.

First, we present some qualitative fitting results in FIG. 4. These images are from the Multi-PIE database. The people in these images have different gender, ethnicity and facial features such as a beard and/or glasses. All these factors can cause difficulties for fitting. As can be seen in FIG. 4, the input images are well fitted. Note that our 3DMM does not model glasses. Therefore, the glasses of an input image, such as the third person in FIG. 4, can misguide the fitting process. Despite it, our ESO reconstructs this face well, showing its robustness. In order to quantitatively measure every component of ESO, the 2D input images and their corresponding groundtruths of camera parameters, 3D shape, light direction and strength, and texture, need to be known. To meet all these requirements, we generated a local database of rendered 2D images with all the 3D groundtruth as follows:

a) 3D Data We collected and registered 20 3D face scans. The first 10 scans are used for model selection, and the remaining scans are used for performance evaluation.

b) Ground truth The registered 3D scans are projected to the PCA space, parameterising the groundtruth in terms of coefficients α and β.

c) Rendering Using the registered 3D scans, we rendered 2D images under different poses and illuminations.

d) Fitting The 3DMM is fitted to obtain the estimates of all these parameters.

e) Reconstruction performance is measured using cosine similarity between the estimated and groundtruth α or β. The larger the cosine similarity, the better the reconstruction.

5.1.1. Effects of Hyperparameters

Before we evaluate the face reconstruction performance, the sensitivity of the hyperparameters of ESO on the fitting process is investigated. The relevant hyperparameters are the regularisation weights $\lambda_1$ in equation 16 and $\lambda_2$ in equation 23 and the number of iterations ($l_1$ and $l_2$) for geometric and photometric refinements (FIG. 1), respectively. All the renderings in Section 5.1.1 are generated by setting both the focal length and the distance between the object and camera to 1800 pixels.

Impact of the Weight $\lambda_1$ on Shape Reconstruction

Figure 5:
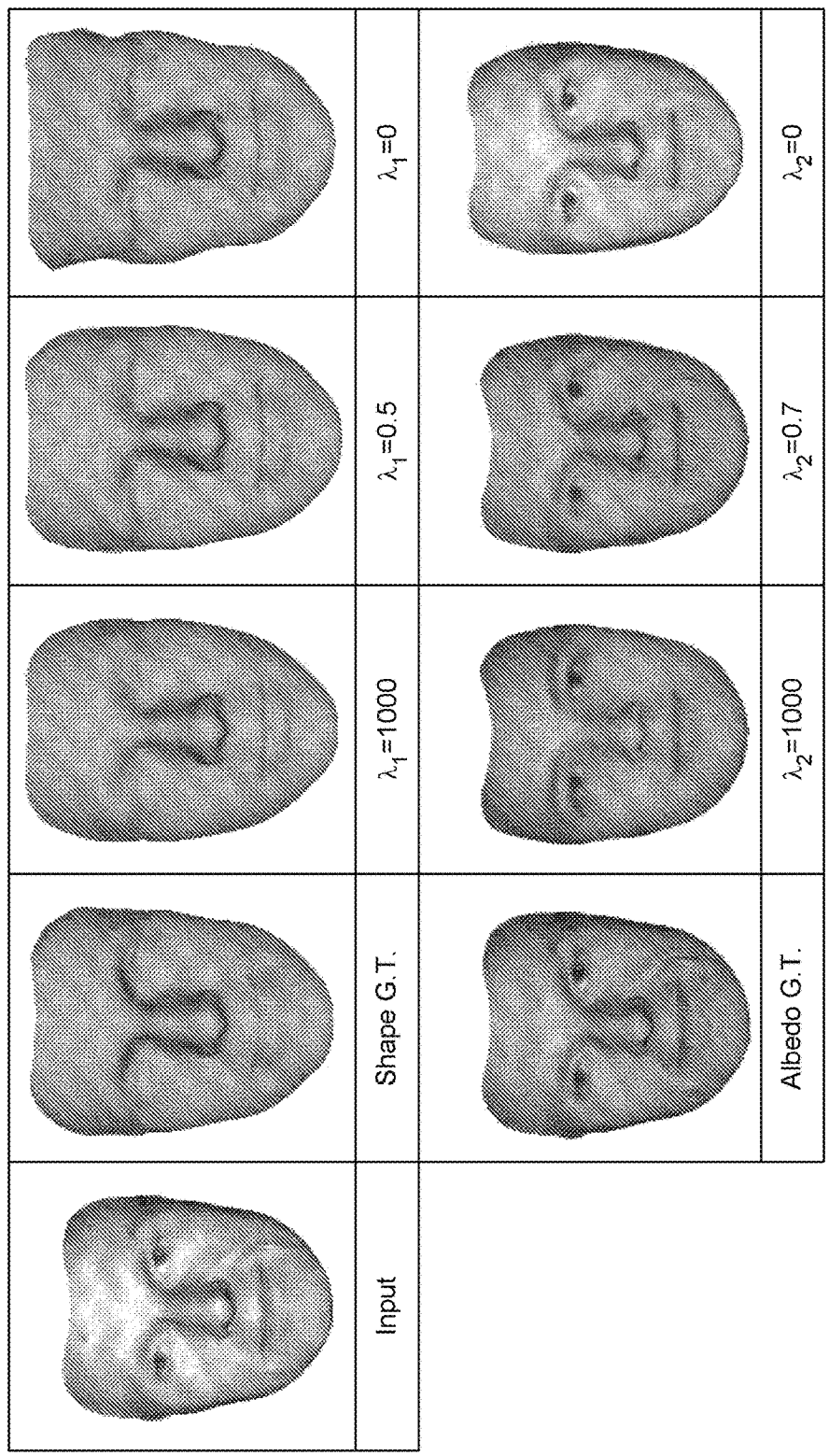
FIG. 5 shows the impact of $\lambda_1$ and $\lambda_2$ on shape and albedo reconstruction.

The weight $\lambda_1$ should be selected carefully because improper $\lambda_1$ will cause under- or over-fitting during shape reconstruction. As shown in FIG. 5, the reconstruction using a large $\lambda_1$ (=1000) looks very smooth and the shape details are lost, exhibiting typical characteristics of underfitting. On the other hand, a small $\lambda_1$ (=0) causes over-fitting, and the reconstruction in FIG. 5 is excessively stretched. In comparison, the reconstruction with $\lambda_1$=0.5 recovers the shape well.

Figure 6:
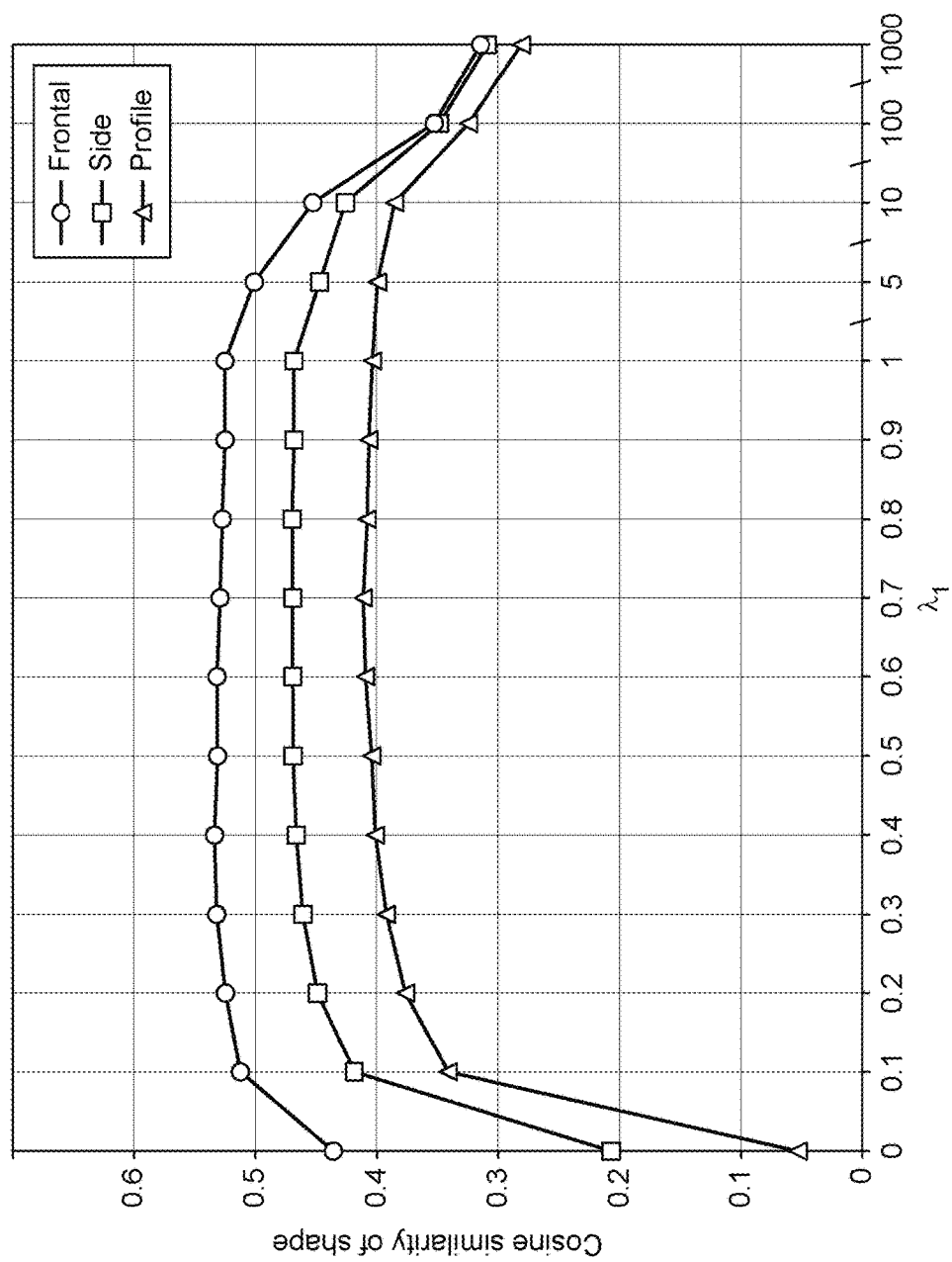
FIG. 6 shows a graph showing the impact of $\lambda_1$ on shape reconstruction over frontal, side and profile poses.

To quantitatively evaluate the impact of $\lambda_1$, 2D renderings under 3 poses (frontal, side and profile), without directed light, are generated. To decouple the impact of $\lambda_1$ and $l_1$ on shape refinement, $l_1$ is set to 1. After ESO fitting, the average similarity of the recovered parameters and their groundtruth for different poses is computed. As shown in FIG. 6, neither small (<0.4) nor large (>1) $\lambda_1$ lead to good reconstruction which is consistent with FIG. 5. On the other hand, the reconstructions of all 3 poses does not change much with $\lambda_1$ in the region between 0.4 and 0.7. Hence, $\lambda_1$ is set to 0.5, which is the average value of the best $\lambda_1$ over all the test cases, to simplify parameter tuning.

Impact of the Number of Iterations $l_1$ on Shape Refinement

Figure 7:
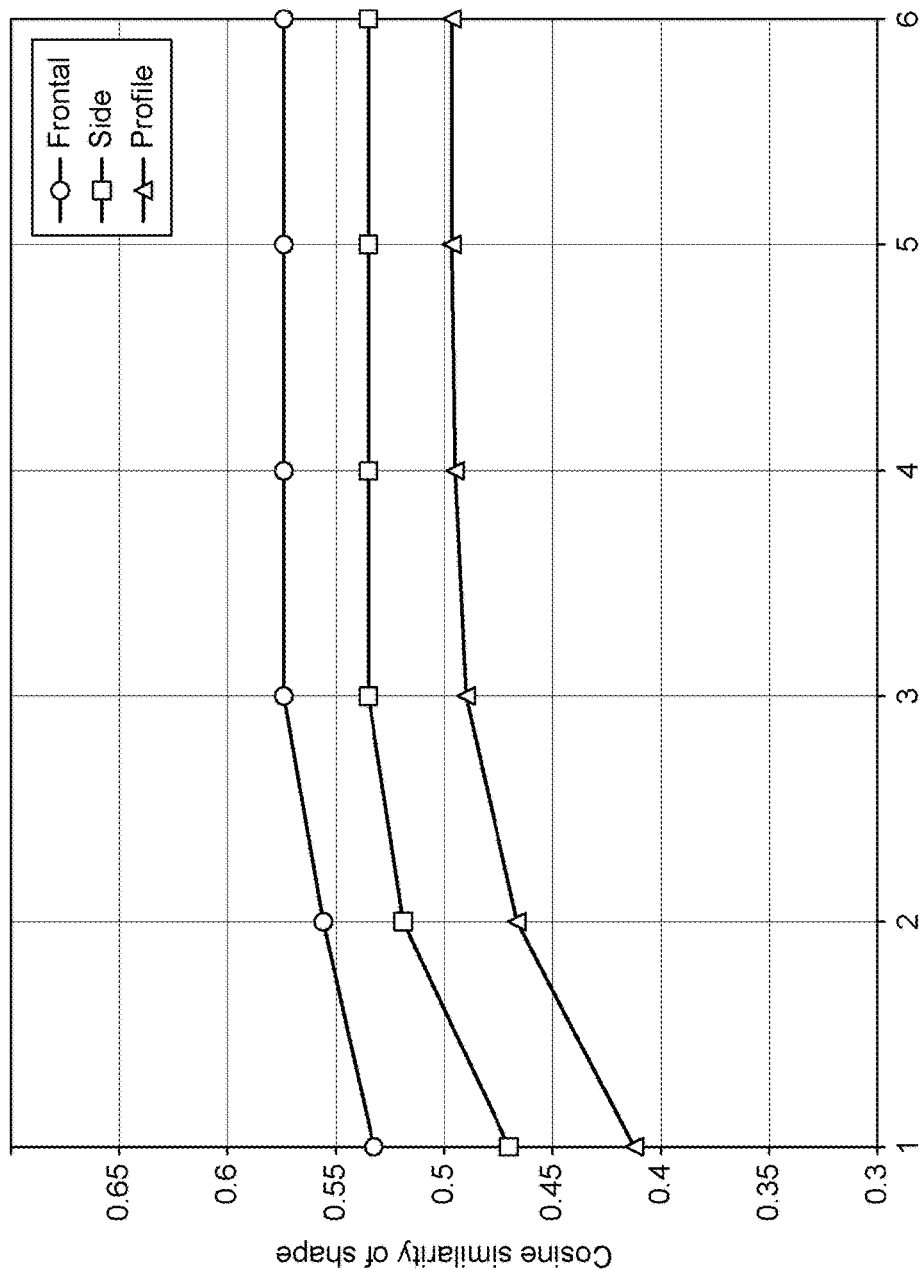
FIG. 7 shows a graph showing the impact of $l_1$ on shape refinement.

The same renderings with 3 poses are used to evaluate the sensitivity to $l_1$. From FIG. 7, we can see that more than 3 iterations do not greatly improve the reconstruction performance for any pose. Therefore, $l_1$ is fixed at 3 in the remaining experiments.

Impact of the Weight $\lambda_2$ on Albedo Reconstruction

We also examine the impact of $\lambda_2$ on albedo reconstruction. FIG. 5 shows some qualitative results. Clearly, the reconstruction with $\lambda_2$=1000 loses the facial details, and it is under-fitted. On the other hand, the one with $\lambda_2$=0 does not separate the illumination and albedo properly, causing overfitting. In comparison, the one with $\lambda_2$=0.7 reconstructs the albedo well.

Figure 8:
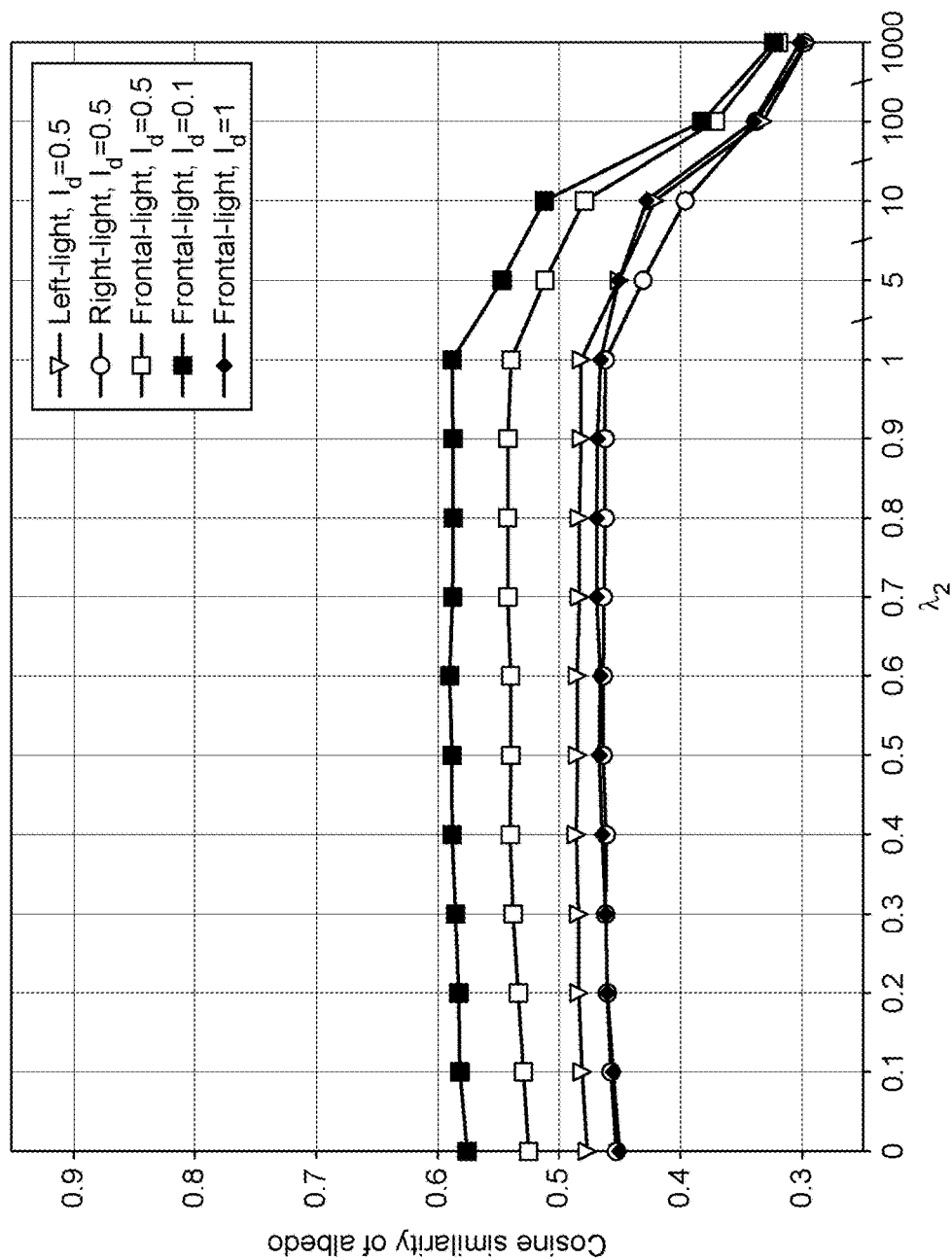
FIG. 8 shows a graph shows a graph showing the impact of $\lambda_2$ on albedo reconstruction.

To quantitatively investigate the impact of $\lambda_2$ on the estimated light direction and strength, the renderings from different light direction d and strength $l_d$ are used as shown in FIG. 8. All these renderings are under frontal pose and $l_2$=1. It is clear that the reconstructed albedo does not change greatly with $\lambda_2$ in the region between 0.2 and 1. To simplify parameter tuning, $\lambda_2$ is fixed to 0.7 which is the average value of the best $\lambda_2$ over all the test cases.

Impact of the Number of Iterations $l_2$ on Albedo Refinement

Figure 9:
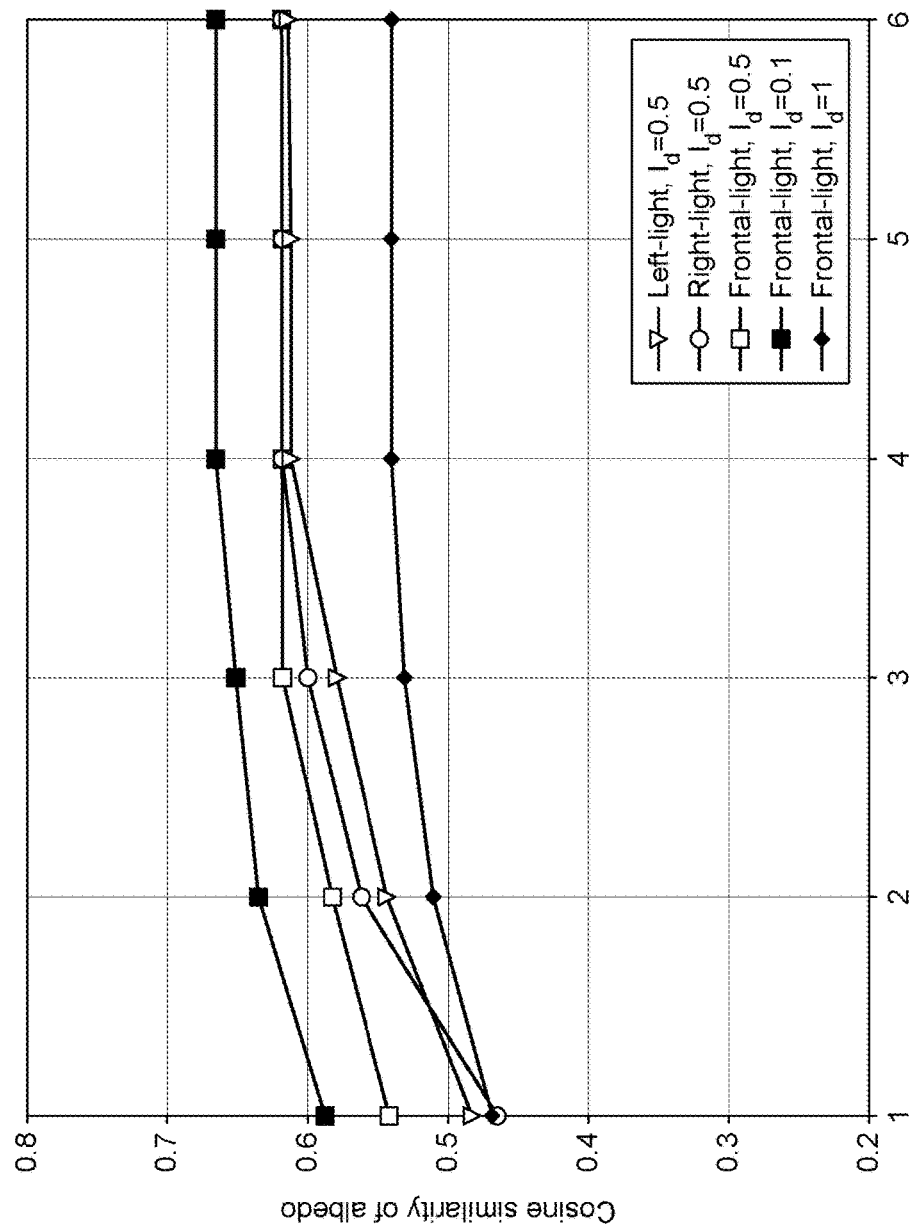
FIG. 9 shows a graph showing the impact of $l_2$ on shape refinement.

To investigate the impact of $l_2$, the same 2D renderings for the $\lambda_2$ evaluation are used. As shown in FIG. 9, all the images converge by the 4th iteration. This shows that our photometric estimation part converges quickly. Hence, for simplicity, $l_2$ is fixed to 4 in ESO.

5.1.2. Reconstruction Results

We evaluate shape and albedo reconstructions separately. ESO is compared with an exemplary SimOpt method (MFF, "Estimating 3D Shape and Texture Using Pixel Intensity, Edges, Specular Highlights, Texture Constraints and a prior," in *Computer Vision and Pattern Recognition,* 2005. IEEE, 2005, pp. 986-993) and an exemplary SeqOpt method (Aldrian et al, "Inverse Rendering of Faces with a 3D Morphable Model", *Pattern Analysis and Machine Intelligence, IEEE Transactions on*, vol. 35, no. 5, pp. 1080-1093, 2013) with an affine camera, respectively. We implemented the whole framework of MFF. Regarding the exemplary SeqOpt method, we only implemented the geometric (camera model and shape) part, because insufficient implementation details of the photometric part were released.

Shape Reconstruction

Figure 10:
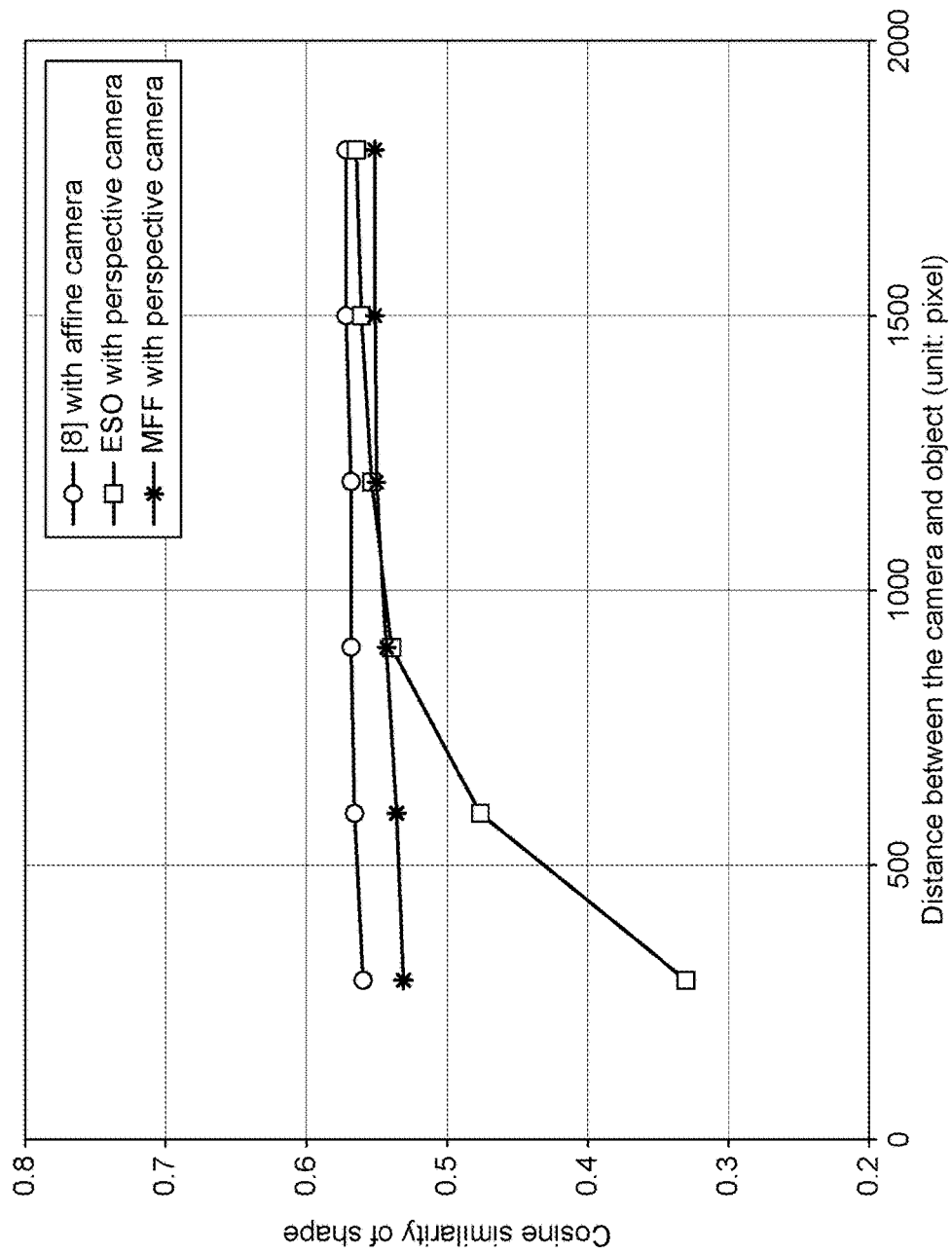
FIG. 10 shows a graph showing shape reconstruction results compared with prior art methods.

As mentioned in Section 1 and 2, the affine camera used by the exemplary prior art SeqOpt method cannot model perspective effects, while the perspective camera used by ESO and MFF can. Different camera models lead to different shape reconstruction strategies. In order to find out how significant this difference is, we change the distance between the object and camera to generate perspective effects, at the same time keeping the facial image size constant by adjusting the focal length to match. Note that the shorter this distance, the larger the perspective distortion. To compare shape reconstruction performance, 2D renderings under frontal pose obtained for 6 different distances are generated. We can see from FIG. 10 that the performance of ESO and MFF remains constant under different perspective distortions. However, the performance of the exemplary SeqOpt method (Aldrian) reduces greatly as the distance between the object and camera decreases. Also, ESO consistently works better than MFF under all perspective distortions.

Albedo Reconstruction

Figure 11:
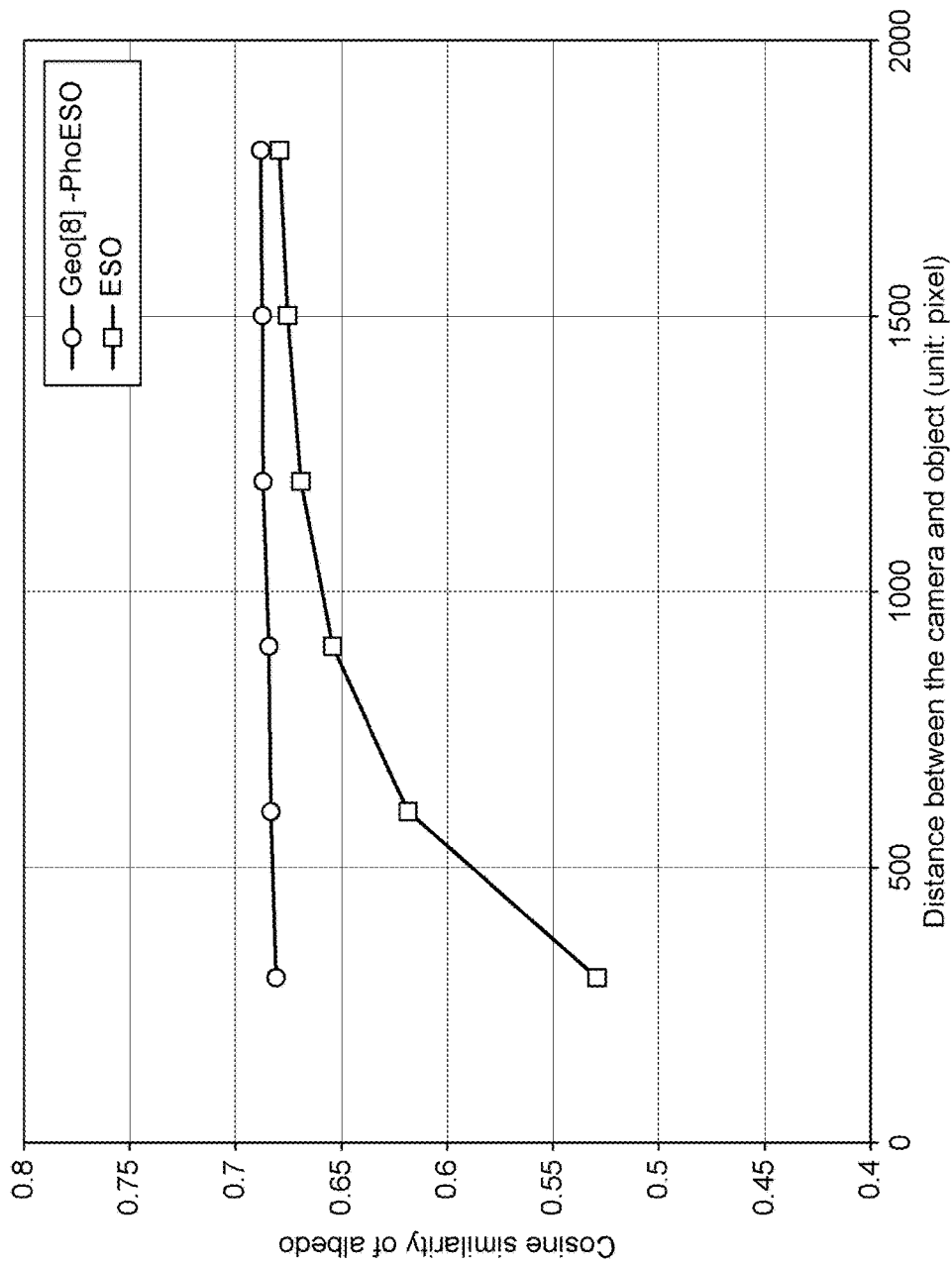
FIG. 11 shows a graph showing albedo reconstruction results compared with prior art methods.

The accuracy of geometric estimation (camera model and shape) affects the photometric estimation (albedo and illumination) because the errors caused by geometric estimation can propagate to photometric estimation. Though we cannot directly compare the albedo estimation of ESO with that of Aldrian, we can evaluate how inferior geometric estimation of Aldrian will degrade the albedo reconstruction. To conduct such an evaluation, we propose a method 'Geo[8]-PhoESO', in which the geometric and photometric estimations are performed by the methods of Aldrian and ESO, respectively. FIG. 11 compares the albedo reconstruction of ESO and 'Geo[8]PhoESO' using the same renderings for shape reconstruction. Clearly, the errors caused by geometric estimation in Aldrian result in inferior albedo reconstructions.

Next, we directly compare ESO with MFF in Table 1 using images rendered under different light direction and strength. We see that the albedo reconstruction performance for different light direction is very similar, but it varies greatly for different directed light strength. This demonstrates that the albedo reconstruction is more sensitive to light strength than direction. Also, ESO consistently works better than MFF. The reasons are two fold: 1) MFF uses a gradient-based method that suffers from non-convexity of the cost function. 2) For computational efficiency, MFF randomly samples only a small number (1000) of polygons to establish the cost function. This is insufficient to capture the information of the whole face, causing under-fitting. Our method being much faster makes use of all the polygons. Further computational efficiency discussions can be found in Section 5.2.1.

TABLE 1

Albedo reconstruction results measured by cosine similarity

| | MFF | ESO |
|---|---|---|
| left-light, $l_d = 0.5$ | 0.57 ± 0.15 | 0.61 ± 0.08 |
| right-light, $l_d = 0.5$ | 0.57 ± 0.13 | 0.60 ± 0.08 |
| front-light, $l_d = 0.5$ | 0.58 ± 0.14 | 0.62 ± 0.08 |
| front-light, $l_d = 0.1$ | 0.60 ± 0.13 | 0.67 ± 0.07 |
| front-light, $l_d = 1$ | 0.49 ± 0.16 | 0.54 ± 0.08 |

5.2. Face Recognition

Face recognition is an important application of 3DMM. 3DMM-based face recognition systems have been successful in this area because a 3DMM can extract the intrinsic 3D shape and albedo regardless of pose and illumination variations.

To evaluate the performance of ESO-based face recognition, the hyperparameters $\{\lambda_1, l_1, \lambda_2, l_2\}$ of ESO are set to $\{0.5, 3, 0.7, 4\}$ as discussed in Section 5.1. Both holistic and local features are extracted following Section 4.8. The cosine distance and Chi-squared distance are used to measure the similarity for holistic and local features respectively.

3DMM can intrinsically model large pose and illumination variations; therefore our face recognition system should be evaluated on databases that reflect this. The commonly-used databases for evaluating the performance of the methods in Section 2.2 are PIE, Multi-PIE, FERET and LFW. Among these, FERET and LFW have limited illumination and pose variations, respectively. Specifically, FERET has only two illumination variations and LFW only contains frontal or near-frontal images. In comparison, PIE and Multi-PIE have large pose and illumination variations; therefore they are used here.

5.2.1. PIE Database

The PIE database is a benchmark database used to evaluate different 3DMM fitting methods. In this section we compare the face recognition performance of ESO with prior art fitting methods.

Protocol

To compare all the methods fairly, the same protocol is used for our system. Specifically, the fitting is initialised by manual landmarks. In addition, we use a subset of PIE, including 3 poses (frontal, side and profile) and 24 illuminations. The gallery set contains the images of frontal view under neutral illumination, and the remaining images are used as probes. The holistic features are used to represent a face, and the matching is performed by cosine similarity.

TABLE 2

Face recognition rate (%) on different poses averaging over all the illuminations on PIE

| | frontal | side | profile | average |
|---|---|---|---|---|
| LiST | 97 | 91 | 60 | 82.6 |
| Zhang | 96.5 | 94.6 | 78.7 | 89.9 |
| Aldrian | 99.5 | 95.1 | 70.4 | 88.3 |
| MFF | 98.9 | 96.1 | 75.7 | 90.2 |
| ESO | 100 | 97.4 | 73.9 | 90.4 |

Results

Face recognition performance in the presence of combined pose and illumination variations is reported in Table 2, which shows the average face recognition rate over all lighting conditions. ESO works substantially better than LiST, and marginally better than Aldrian, Zhang and MFF. Note that MFF, whose performance is very close to ESO, has more than 10 hyperparameters, causing difficulties for optimal parameter selection. In contrast, ESO has only 4 hyperparameters.

Computational Complexity

The optimisation time was measured on an Intel Corel Duo CPU E8400 and 4G memory computer. The best SimOpt method MFF and SeqOpt method are compared with ESO. MFF took 23.1 seconds to fit one image, while ESO took only 2.1 seconds. Aldrian did not report their run time, but determined the albedo estimation (dominant step) complexity to be of $0$ $(m^2p)$: 'p' is the number of vertices, which is the same for ESO; 'm' is the number of texture coefficients. Note that firstly Aldrian uses not only one group of global α and β but also four additional local groups to improve the model representation capacity, while we only use the global parameters. Therefore, 'm' in our approach is one fifth of Aldrian. Secondly the reported face recognition rate in Aldrian was achieved by using the shape parameters from MFF, which is gradient-based and therefore rather slow, and albedo parameters from Aldrian. Thus, our ESO is more efficient than Aldrian.

5.2.2. Multi-PIE Database

To compare with other state-of-the-art methods, evaluations are also conducted on a larger database, Multi-PIE, containing more than 750,000 images of 337 people. In addition, our face recognition systems initialised by both manually and automatically detected landmarks are compared. We used a cascaded regression method to automatically detect landmarks.

Protocol

There are two settings, Setting-I and Setting-II, widely used in prior art methods. Setting-I is used for face recognition in the presence of combined pose and illumination variations, Setting-II for face recognition with only pose variations.

Setting-I uses a subset in session 01 consisting of 249 subjects with 7 poses and 20 illumination variations. These 7 poses have a yaw range from left 45° to right 45° in step of 15°. The images of the first 100 subjects constitute the training set. The remaining 149 subjects form the test set. In the test set, the frontal images under neutral illumination work as the gallery and the remaining are probe images.

Setting-II uses the images of all the 4 sessions (01-04) under 7 poses and only neutral illumination. The images from the first 200 subjects are used for training and the remaining 137 subjects for testing. In the test set, the frontal images from the earliest session for the 137 subjects work as gallery, and the others are probes.

ESO Vs Deep Learning (Setting-I)

In recent years, deep learning methods have achieved considerable success in a range of vision applications. In particular, deep learning works well for pose- and illumination-invariant face recognition. To the best of our knowledge, these methods have reported the best face recognition rate so far on Multi-PIE over both pose and illumination variations. Systems deploying these methods learned 3 pose- and illumination-invariant features: FIP (face identity-preserving), RL (FIP reconstructed features), and MVP (multi-view perceptron) using convolutional neural networks (CNN). Table 3 compares ESO with these deep learning methods and the baseline method. Not surprisingly, deep learning methods work better than the baseline method because of their powerful feature learning capability. However, ESO with automatic annotation, using either holistic or local features, outperforms these three deep learning solutions as shown in Table 3. We conclude that the superior performance of ESO results from the fact that the fitting process of ESO can explicitly model the pose. In contrast, the deep learning methods try to learn the view/pose-invariant features across different poses. This learning objective is highly non-linear, leading to a very large search space, so that the methods tend to get trapped in local minima. In contrast, ESO solves several convex problems and avoids this pitfall.

Automatic Vs Manual Annotation (Setting-I)

Table 3 also compares the performance of ESO with the fully automatic annotation against that based on manual annotation. This table shows that the mean face recognition rates of the fully automatic system are close to those relying on manual annotation: 88.0% vs 91.2% for holistic features, and 91.5% vs 92.2% for local features. It means that ESO is reasonably robust to the errors caused by automatically detected landmarks for both holistic and local features. The superiority of local features which can capture more facial details than holistic features is also evident from the results.

ESO for Pose-robust Face Recognition (Setting-II)

Table 4 compares ESO with the state-of-the-art methods for pose-robust face recognition. The methods can be classified into 2D and 3D approaches as discussed in Section 2.2. In the 2D category, PLS and CCA are unsupervised methods, and consequently they deliver inferior performance. The GMA benefits from its use of the additional supervisory information. DAE and SPAE are auto-encoder-based methods, which have superior capability to learn the non-linear relationships between images of different poses. Unlike the other 2D methods which learn the projection from different poses to frontal pose directly, SPAE learns the mapping from a large range of pose variations to a set of narrow ranges progressively. In this way, SPAE splits a large search space into several small ones, reducing the complexity of the learning task. SPAE achieves state-of-the-art performance, even compared with 3D methods. However, our ESO outperforms SPAE, specifically 94.4% vs 91.4%, because of its accurate shape and albedo reconstruction capability. In particular, ESO works much better than other state-of-the-art methods in the presence of larger pose variations, demonstrating its superior pose modelling capability.

TABLE 3

Face recognition rate (%) on different poses averaging all the illuminations on Multi-PIE (Setting-I)

| Method | Annotation | Feature | −45° | −30° | −15° | +15° | +30° | +45° | Average | 0° |
|---|---|---|---|---|---|---|---|---|---|---|
| Li [17] | Manual | Gabor | 63.5 | 69.3 | 79.7 | 75.6 | 71.6 | 54.6 | 69.1 | N/A |
| Deep Learning | Automatic | RL | 66.1 | 78.9 | 91.4 | 90.0 | 82.5 | 62.0 | 78.5 | 94.3 |
| | | FIP | 63.6 | 77.5 | 90.5 | 89.8 | 80.0 | 59.5 | 76.81 | 94.1 |
| | | MVP | 75.2 | 83.4 | 93.3 | 92.2 | 83.9 | 70.6 | 83.1 | 95.7 |
| ESO | Automatic | Holistic ($\alpha$, $\beta$) | 73.8 | 87.5 | 95.0 | 95.1 | 90.0 | 76.2 | 86.3 | 98.7 |
| | | Local (LPQ) | 79.6 | 91.6 | 98.2 | 97.9 | 92.6 | 81.3 | 90.2 | 99.4 |
| | Manual | Holistic ($\alpha$, $\beta$) | 80.8 | 88.9 | 96.7 | 97.6 | 93.3 | 81.1 | 89.7 | 99.1 |
| | | Local (LPQ) | 81.1 | 93.3 | 97.7 | 98.0 | 93.3 | 82.4 | 91.0 | 99.6 |

TABLE 4

Face recogniton rate (%) on different poses under neutral illumination on Multi-PIE (Setting-II)

| | Method | Annotation | −45° | −30° | −15° | 15° | 30° | 45° | Average |
|---|---|---|---|---|---|---|---|---|---|
| 2D | PLS | Manual | 51.1 | 76.9 | 88.3 | 88.3 | 78.5 | 56.5 | 73.3 |
| | CCA | | 53.3 | 74.2 | 90.0 | 90.0 | 85.5 | 48.2 | 73.5 |
| | GMA | | 75.0 | 74.5 | 82.7 | 92.6 | 87.5 | 65.2 | 79.6 |
| | DAE | Automatic | 69.9 | 81.2 | 91.0 | 91.9 | 86.5 | 74.3 | 82.5 |
| | SPAE | | 84.9 | 92.6 | 96.3 | 95.7 | 94.3 | 84.4 | 91.4 |
| 3D | Asthana | Automatic | 74.1 | 91.0 | 95.7 | 95.7 | 89.5 | 74.8 | 86.8 |
| | MDF | | 78.7 | 94.0 | 99.0 | 98.7 | 92.2 | 81.8 | 90.7 |
| | ESO + LPQ | | 91.7 | 95.3 | 96.3 | 96.7 | 95.3 | 90.3 | 94.4 |

6. Conclusions

In this work, we proposed an efficient stepwise optimisation (ESO) strategy for 3D Morphable Model to 2D image fitting. ESO decouples the geometric and photometric optimisations and uses least squares to optimise sequentially the pose, shape, light direction, light strength and albedo parameters in separate steps. In addition, ESO is robust to landmarking errors caused by the automatic landmark detector. Based on the ESO fitting, a face recognition system, which can extract not only the traditional holistic features but also local features, is evaluated on benchmark datasets. The experimental results demonstrate that the face reconstruction and recognition performance achieved with ESO is superior to state-of-the-art methods.

The present invention relates to performing 3D face reconstruction from a single 2D image using a 3D Morphable Model (3DMM) in an analysis-by-synthesis approach. However, performing this reconstruction (fitting) efficiently and accurately is a challenge. The present invention provides an efficient stepwise 3DMM-to-2D image-fitting strategy, which optimises sequentially the pose, shape, light direction, light strength and skin texture parameters in separate steps. A perspective camera and Phong reflectance model are used to model the geometric projection and illumination respectively. Linear methods that are adapted to camera and illumination models are used. This generates closed-form solutions for these parameters, leading to an accurate and efficient fitting.

Apart from face reconstruction, 3DMMs are widely used for face recognition. However, existing 3DMM-based methods use manual landmarks to initialise the fitting and produce holistic facial features. The present invention also provides an automatic face recognition system, which can detect landmarks automatically and extract both holistic and local features using a 3DMM.

The described method has been tested on the public CMU-PIE, Multi-PIE face databases and one local database. The experimental results show that the face reconstruction performance is better than that achieved by the existing 3DMMs. Furthermore, the described face recognition system outperforms the state-of-the-art methods. In particular, it significantly outperforms deep learning methods tested on Multi-PIE.

Whilst certain embodiments of the invention have been described herein with reference to the drawings, it will be understood that many variations and modifications will be possible without departing from the scope of the invention as defined in the accompanying claims.

The invention claimed is:

1. A method of fitting a three dimensional 3D model to an object in a two dimensional 2D image, the method comprising:
   detecting a plurality of image landmarks on the object in the 2D image;
   estimating 3D geometric information of the plurality of image landmarks from the 2D image and known geometric information of a base model; and
   refining the geometric information of the base model in dependence on a cost function relating to a distance in 3D space between the image landmarks and corresponding model landmarks on the base model, based on the estimated 3D geometric information of the plurality of image landmarks, so as to reduce the distance in 3D space between the image landmarks and the corresponding model landmarks.

2. The method of claim 1, wherein estimating 3D geometric information comprises:
   projecting the plurality of image landmarks onto the surface of the generic 3D model in order to estimate a depth of said image landmark in three-dimensional space.

3. The method of claim 1, wherein refining the geometric information of the base model comprises minimising the distance between the image landmarks and the corresponding model landmarks by iteratively adjusting the pose and shape of the base model.

4. The method of claim 1, wherein the plurality of image landmarks are on the contour edge of the object in the 2D image.

5. The method of claim 1, wherein estimating 3D geometric information of a plurality of image landmarks comprises estimating 3D geometric information of between 2 and 100 image landmarks.

6. The method of claim 1, further comprising:
   estimating light direction and light strength of the object from the 2D image;
   estimating the albedo of the object based on the estimated light direction and light strength;
   iteratively refining the estimation of light direction and light strength using the estimated albedo; and
   applying the refined light direction, light strength and albedo to the base model.

7. The method of claim 6, wherein estimating the light direction and light strength comprises linearising a Phong model by keeping specular reflectance and shininess constant across the iterations.

8. The method of claim 1, wherein the object is a human face.

9. A method of performing facial recognition, the method comprising:
   generating a 3D model according to claim 8;
   rotating the 2D image to a frontal view using the 3D model;
   extracting local features from the 2D image; and
   comparing the local features with images in a database.

10. A non-transitory computer readable storage medium arranged to store computer program instructions which, when executed on one or more processors, perform the method according to claim 1.

11. Apparatus for fitting a three dimensional 3D model to an object in a two dimensional 2D image, the apparatus comprising:
one or more processors; and
computer-readable memory arranged to store computer program instructions which, when executed by the one or more processors, cause the apparatus to:
detect a plurality of image landmarks on the object in the 2D image;
estimate 3D geometric information of the plurality of image landmarks from the 2D image and known geometric information of a base model; and
refine the geometric information of the base model in dependence on a cost function relating to a distance in 3D space between the image landmarks and corresponding model landmarks on the base model, based on the estimated 3D geometric information of the plurality of image landmarks, so as to reduce the distance in 3D space between the image landmarks and the corresponding model landmarks.

12. The apparatus of claim 11, wherein estimating 3D geometric information comprises:
projecting the plurality of image landmarks onto the surface of the generic 3D model in order to estimate a depth of said image landmark in three-dimensional space.

13. The apparatus of claim 11, wherein refining the geometric information of the base model comprises minimising the distance between the image landmarks and the corresponding model landmarks by iteratively adjusting the pose and shape of the base model.

14. The apparatus of claim 11, wherein the plurality of image landmarks are on the contour edge of the object in the 2D image.

* * * * *